US005795134A

United States Patent [19]
Malecha

[11] Patent Number: 5,795,134
[45] Date of Patent: *Aug. 18, 1998

[54] PRESSURIZED AIR SYSTEM

[75] Inventor: Michael Richard Malecha, Lonsdale, Minn.

[73] Assignee: Air-Lite Transport, Inc., Hudson, Wis.

[*] Notice: The term of this patent shall not extend beyond the expiration date of Pat. No. 5,533,866.

[21] Appl. No.: 649,451

[22] Filed: May 17, 1996

Related U.S. Application Data

[63] Continuation-in-part of Ser. No. 254,862, Jun. 6, 1994, Pat. No. 5,533,866.

[51] Int. Cl.[6] .................................................. F04B 49/06
[52] U.S. Cl. .................................... 417/44.9; 417/25
[58] Field of Search ................................ 417/25, 26, 36, 417/38, 44.2, 44.9; 60/410, 416, 418

[56] References Cited

U.S. PATENT DOCUMENTS

| 2,221,857 | 11/1940 | Bartholomew | 417/25 |
|---|---|---|---|
| 2,244,384 | 6/1941 | Bissinger | 60/410 |
| 2,345,797 | 4/1944 | Corson | 417/25 |
| 3,043,495 | 7/1962 | Hewitt | 417/20 |
| 3,744,602 | 7/1973 | Ajwani | 192/3 R |
| 3,888,603 | 6/1975 | Nagase | 417/44.9 |
| 4,714,483 | 12/1987 | Koening et al. | 55/163 |
| 5,580,136 | 12/1996 | Hanschek . | |
| 5,588,716 | 12/1996 | Stumpe . | |

FOREIGN PATENT DOCUMENTS

| 403015681 | 1/1991 | Japan | 417/44.2 |

OTHER PUBLICATIONS

"Service Data", SD-01-16, D-2 Governor, Bendix, 4 pages (unnumbered), U.S.A., Jul. 1984.

Conventional Service Manual, Models FLA & FLD, "Air Brake Proportioning System", §12.02—General Description and Principles of Operation, Supplement 6, Bendix, pp. 050/1-050/3, Feb. 1989.

Conventional Service Manual Models FLA & FLD, "Air Brake Proportioning System", §12.02—Specifications, Supplement 6, Bendix, p. 400/1, Feb. 1989.

Primary Examiner—Charles G. Freay
Assistant Examiner—Xuan M. Thai
Attorney, Agent, or Firm—Merchant, Gould, Smith, Edell, Welter & Schmidt, P.A.

[57] ABSTRACT

A pressurized air system controls air pressure in air reservoirs that deliver compressed air to air-actuated components in a vehicle. An air compressor supplies compressed air to air reservoirs which deliver compressed air to air-actuated components. A control system measures the air pressure in the air reservoirs by using at least one electric switch. Each switch is connected to an air reservoir and generates an electric signal to an electrically controlled valve indicative of the measured air pressure in the corresponding air reservoir. The electrically controlled valve is connected to an air compressor. The electrically controlled valve moves between a first position causing the air compressor to supply compressed air to the air reservoirs and a second position causing the air compressor to stop supplying compressed air to the air reservoirs responsive to the received electronic signal.

12 Claims, 11 Drawing Sheets

PRESSURIZED AIR SYSTEM

CROSS REFERENCED TO RELATED APPLICATION

This application is a continuation-in-part of U.S. Ser. No. 08/254,862, filed Jun. 6, 1994, now U.S. Pat. No. 5,533,866 and entitled "PRESSURIZED AIR SYSTEM".

BACKGROUND OF THE INVENTION

I. Field of the Invention

This invention pertains to a pressurized air system for vehicles and, more particularly, to a control system for regulating air pressure in vehicle air reservoirs.

II. Description of the Prior Art

In the prior art, a particular embodiment of a pressurized air system for vehicles which controls the air pressure in air reservoirs between a predetermined maximum air pressure and a predetermined minimum air pressure, by use of an air governor, is well known. Air governors are commonly used in trucks to control air pressures in air reservoirs which deliver air to service brakes and other air-actuated components.

In a typical embodiment of the prior art as implemented in a truck having a tandem and possibly a trailer, the air governor is connected to a supply reservoir (also known as a "wet tank"). The supply reservoir is an air reservoir connected in parallel with a primary air reservoir and a secondary air reservoir. Generally, one air reservoir is connected only to service brakes on the tandem and the trailer. The other air reservoir may be connected to front brakes, parking brakes, windshield wipers and other air-actuated components.

The air pressure from the supply reservoir enters the air governor and acts on a piston and an inlet\exhaust valve. As air pressure in the supply reservoir increases to the predetermined maximum air pressure, an inlet passage of the air governor opens, allowing air pressure to flow through the inlet passage and to an air compressor unloading mechanism. The flow of air to the air compressor unloading mechanism causes the air compressor to stop compressing air. As air pressure in the supply reservoir decreases to the predetermined minimum air pressure, the inlet passage closes and the exhaust opens, allowing air in the unloading mechanism to escape back through the air governor and out of an exhaust port. The release of air from the unloading mechanism actuates the air compressor to compress air and supply compressed air to the supply reservoir and the other air reservoirs.

The air governor is generally mounted to the air compressor, although it can be remotely mounted. It is generally not mounted in the cab due to its noise and size. An example of such an air governor is the Bendix D-2 Governor, No. SD-01-16, Service Date Jul. 1984.

While the air governor such as described has proven to be useful in the industry, it has several disadvantages. When mounted to the air compressor or elsewhere in the engine compartment, the air governor is exposed to excessive vibration from the engine, dirt, extreme temperature fluctuations, moisture and other problematic external parameters. Because of the air governor's numerous moving parts and continued exposure to external parameters while in operation, the air governor fails frequently and unpredictably. When the air governor fails, service brakes can lock up and other air-actuated components can stop working. In addition, maintenance and trouble-shooting are difficult due to the frequent, unpredictable failure of parts and the large number of small high tolerance moving parts within the air governor. Finally, the air governor measures system air pressure from the supply reservoir which receives air directly from the air compressor, rather than measuring the actual air pressure in the air reservoirs that provide air to the air-actuated components. Air pressure from the supply reservoir is not always a reliable measure of air pressure in the primary and secondary reservoirs due to leaks downstream from the supply reservoir.

SUMMARY OF THE INVENTION

According to a preferred embodiment of the present invention, a pressurized air system for controlling air pressures in air reservoirs which deliver compressed air to air-actuated components in a vehicle is disclosed. The pressurized air system operates effectively with at least one air reservoir. In the preferred embodiment, however, an air compressor is connected to two air reservoirs and supplies compressed air to the air reservoirs when the air compressor is actuated. The air reservoirs are connected to air-actuated components such as, for example, service brakes, parking brakes, and windshield wipers. In another embodiment, the air compressor is connected to a supply reservoir which is connected to the air reservoirs.

A control system measures the air pressures in the air reservoirs and actuates the air compressor to compress air and supply compressed air to the air reservoirs when air pressure in at least one of the air reservoirs decreases to at least a predetermined minimum air pressure, and disengages the air compressor to stop compressing air when air pressures in both of the air reservoirs increase to at least a predetermined maximum air pressure. In one embodiment, the control system includes two switches, each being connected to one air reservoir, and an actuator. The actuator consists of a valve and an electric valve setter for moving the valve between a first position and a second position. The switches respond to the changing air pressures in their corresponding air reservoirs. The switches are electrically connected to the electric valve setter. The actuator is operatively connected to the air compressor. When air pressure in at least one of the reservoirs decreases to at least the predetermined minimum air pressure, the corresponding switch(es) sends an electric signal to the actuator. The electric signal causes the electric valve setter to move the valve to the first position, allowing air to escape from an unloading mechanism back through the valve, which actuates the air compressor to compress air. When air pressures in both reservoirs increase to at least the predetermined maximum, neither switch generates an electric signal. The absence of an electric signal causes the electric valve setter to move the valve to the second position, forcing air to flow into the unloading mechanism, which disengages the air compressor to stop compressing air.

In another embodiment of the present invention, the air compressor is connected to a supply reservoir, which is connected to at least one air reservoir. The air reservoir supplies air to air-actuated components. The control system is operatively connected to the supply reservoir for measuring air pressure from the supply reservoir, rather than measuring air pressure from the air reservoir that provides air to air-actuated components. In this embodiment, the control system consists of only one switch connected to an actuator. The basic operation of the control system in this embodiment remains the same. However, the switch generates an electric signal in response to air pressure changes in the supply reservoir, rather than the air reservoirs that provide air to air-actuated components.

It is an object of the present invention to provide a reliable pressurized air system that is not prone to unpredictable failures and breakdowns and that minimizes service brakes locking up.

It is a further object of the present invention to provide a pressurized air system that is easy to maintain, with easy access to the control system for trouble-shooting and repair work.

It is another object of the present invention to provide electrical control of the pressurized air system using electrical switches responsive to air pressures in the individual air reservoirs.

It is an object of one embodiment of the present invention to provide electrical control of the pressurized air system based upon air pressure levels sensed directly from the air reservoirs that provide air to air-actuated components.

It is an object of another embodiment of the present invention to provide electrical control of the pressurized air system based upon air pressure levels sensed from a supply reservoir.

It is yet a further object of the present invention to allow simple conversion from the prior art to an embodiment of the present invention.

While the present invention is described in association with a particular type of switch, the invention is not limited to the use of such a switch as described. Further, while the invention is described in association with a particular type of actuator, it is to be understood that the invention is not limited to the use of such an actuator as described. It will be known that the invention applies to a control system wherein the actuator controls the operation of the air compressor using air or a mechanical method, or the like. For example, a mechanically controlled air compressor may include an air compressor with a diverter valve wherein the air compressor continually compresses air. When the air pressure in at least one of the air reservoirs decreases to at least a predetermined minimum air pressure, the control system closes the diverter valve so that the compressed air generated by the air compressor is forced to flow through the system to the air reservoirs. When air pressures in both of the air reservoirs increase to at least a predetermined maximum air pressure, the control system opens the diverter valve so that the compressed air generated by the air compressor is released from the system.

While the invention is described with reference to two reservoirs for controlling air-actuated components, the invention operates effectively with any number of reservoirs. Finally, while the invention is described with reference to a particular configuration of an electrical control system, it is to be understood that the invention is not limited to such a control system or wiring convention and it will be known that the invention applies to other types of electrical control systems, such as a pressure sensor and microprocessor driven control system or the like. These and other features of the invention will become apparent to those skilled in the art upon a more detailed description of a preferred embodiment of the invention.

DETAILED DESCRIPTION

In the following detailed description of the preferred embodiment, reference is made to the accompanying drawing which forms a part hereof, and in which is shown by way of illustration specific embodiments in which the invention may be practiced. It is to be understood that other embodiments may be utilized and structural changes may be made without departing from the scope of the present invention.

Figure 1:
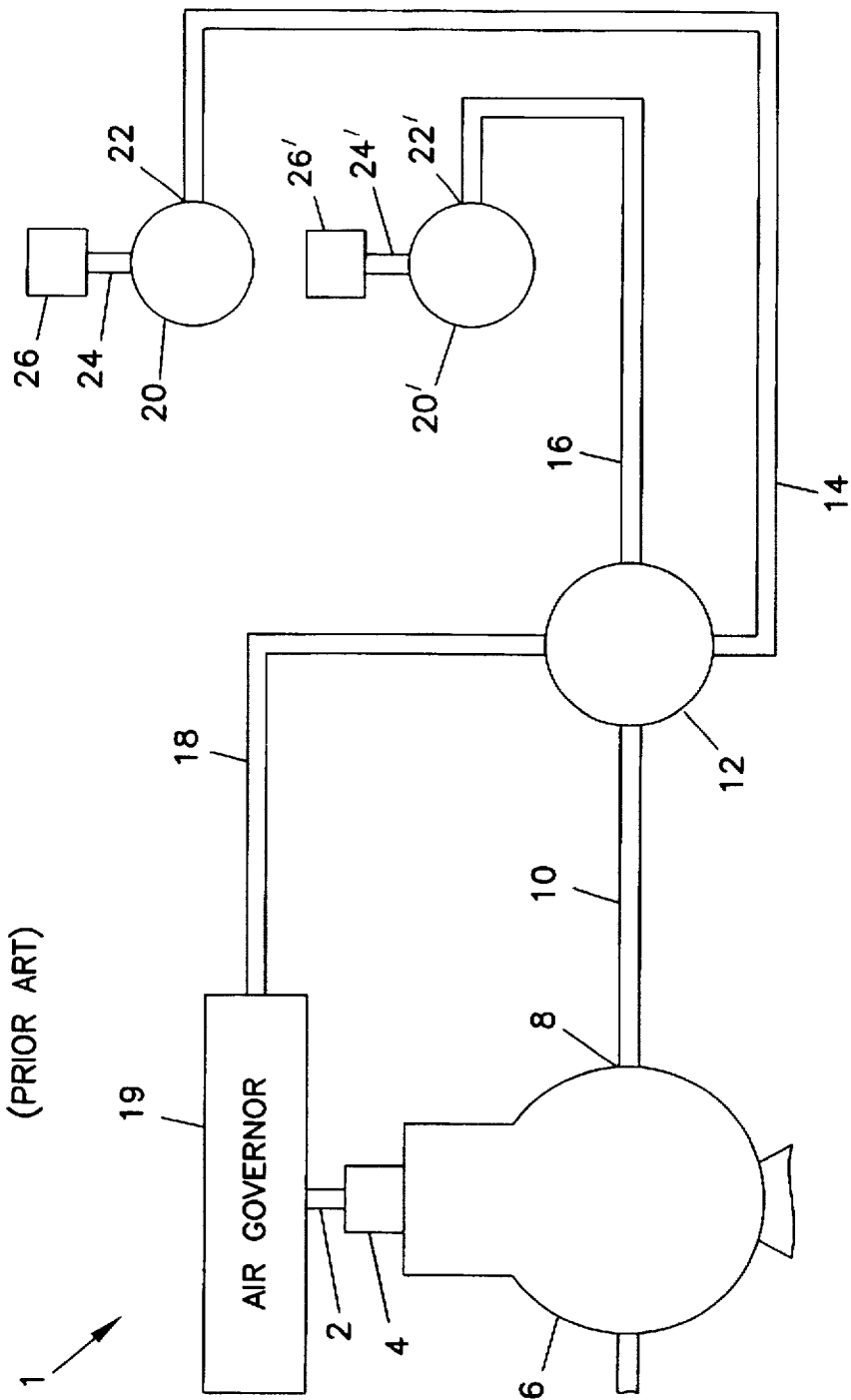
FIG. 1 is a schematic representation of a prior art pressurized air system utilizing an air governor.

FIG. 1 shows the structure of a pressurized air system 1 designed in accordance with the prior art. Referring to FIG. 1, an air compressor 6 is connected from an air compressor outlet 8 to a supply reservoir 12 by conduit 10. The supply reservoir 12 is connected to a first reservoir 20 by conduit 14 and to a second reservoir 20' by conduit 16.

The first reservoir 20 is connected by conduit 24 to a first set of air-actuated components 26. The second reservoir 20' is connected by conduit 24' to a second set of air-actuated components 26'. In the prior art, one set of air-actuated components consists of only service brakes and the other set of air-actuated components includes at least parking brakes, windshield wipers and front service brakes.

The supply reservoir 12 is also connected to an air governor 19 by conduit 18. The air governor 19 is connected to an unloading mechanism 4 by an unloading mechanism conduit 2. The unloading mechanism is attached to the air compressor 6 and controls the operation of the air compressor 6. Use of an air compressor 6 with an unloading mechanism 4 is well known in the art.

Generally, the air compressor 6 compresses air and supplies compressed air through the compressor air outlet 8 into conduit 10 and to supply reservoir 12. The compressed air then flows from the supply reservoir 12 through conduit 14 to the first reservoir 20 and through conduit 16 to the second reservoir 20'. The first reservoir 20 and the second reservoir 20' provide compressed air to the first set of air-actuated components 26 and the second set of air-actuated components 26', respectively. The supply reservoir 12 continuously provides air to the air governor 19 through conduit 18. The operation of the air governor 19 has previously been described herein. Generally, the air governor 19 actuates the air compressor 6 to compress air, as previously described herein, when air pressure in the supply reservoir 12 falls below a predetermined minimum air pressure. The air governor 19 disengages the air compressor 6 to stop compressing air, as previously described herein, when air pressure in the supply reservoir 12 rises above a predetermined maximum air pressure.

Figure 2:
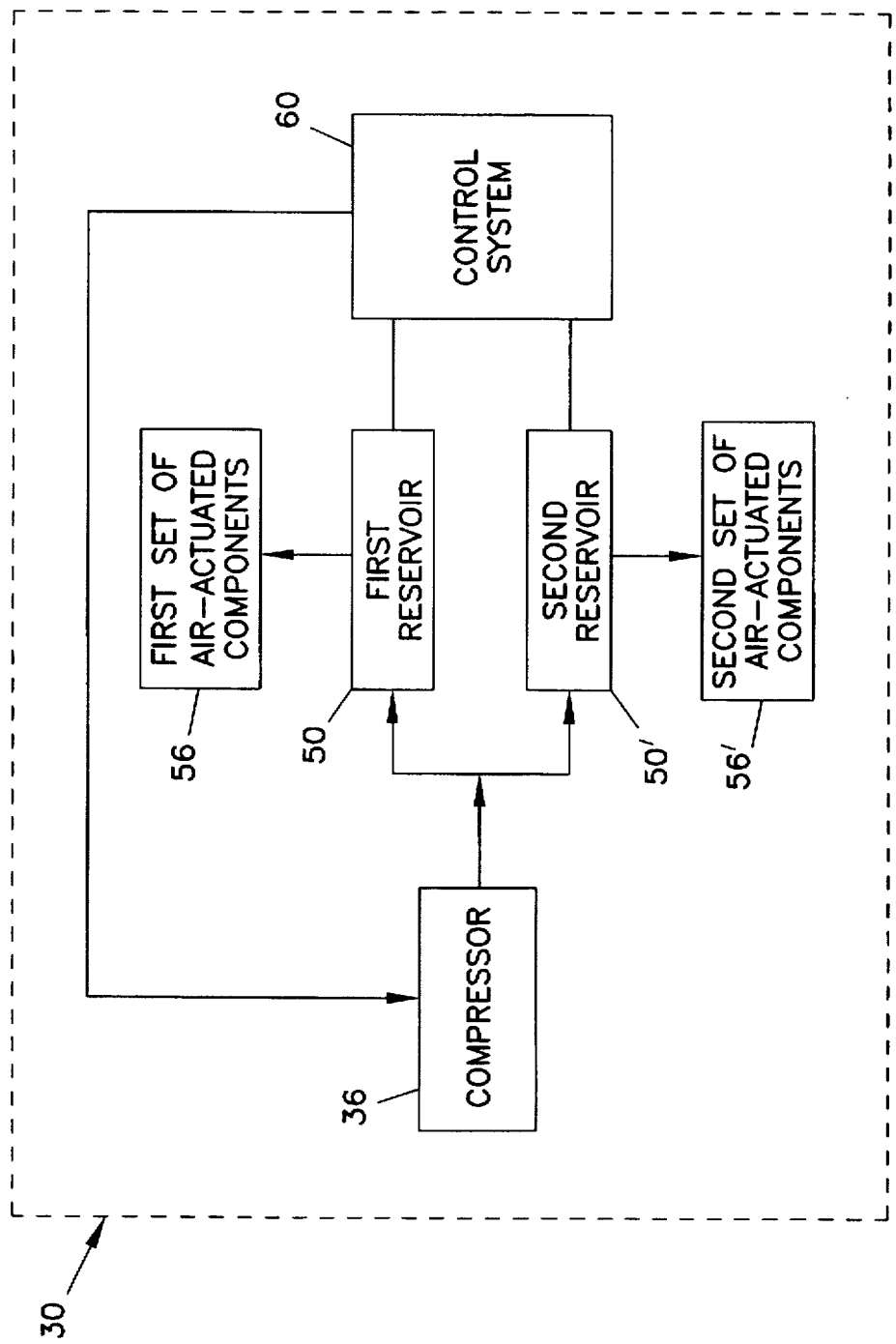
FIG. 2 is a block diagram of one embodiment of the pressurized air system according to the present invention.

FIG. 2 is a block diagram representation of one embodiment of the pressurized air system 30 according to the present invention. The air compressor 36 is connected to a first reservoir 50 and a second reservoir 50'. The first reservoir 50 and the second reservoir 50' are connected to a first set of air-actuated components 56 and a second set of air-actuated components 56', respectively. Unlike the prior art, the air compressor 36 may be connected directly to the first reservoir 50 and the second reservoir 50'. A supply reservoir, as shown in the prior art at 12, may be eliminated in the present invention. The first reservoir 50 and the second reservoir 50' are connected to a control system 60. The control system is operatively connected to the air compressor 36 for actuating and disengaging the air compressor 36 in response to air pressure levels in the first reservoir 50 and the second reservoir 50'. The control system 60 can control the operation of the air compressor 36 by air, mechanical means, or any other means in which the compressor is controlled to supply compressed air to the air reservoirs when needed and to stop the supply of compressed air to the air reservoirs when it is not needed.

Figure 7:
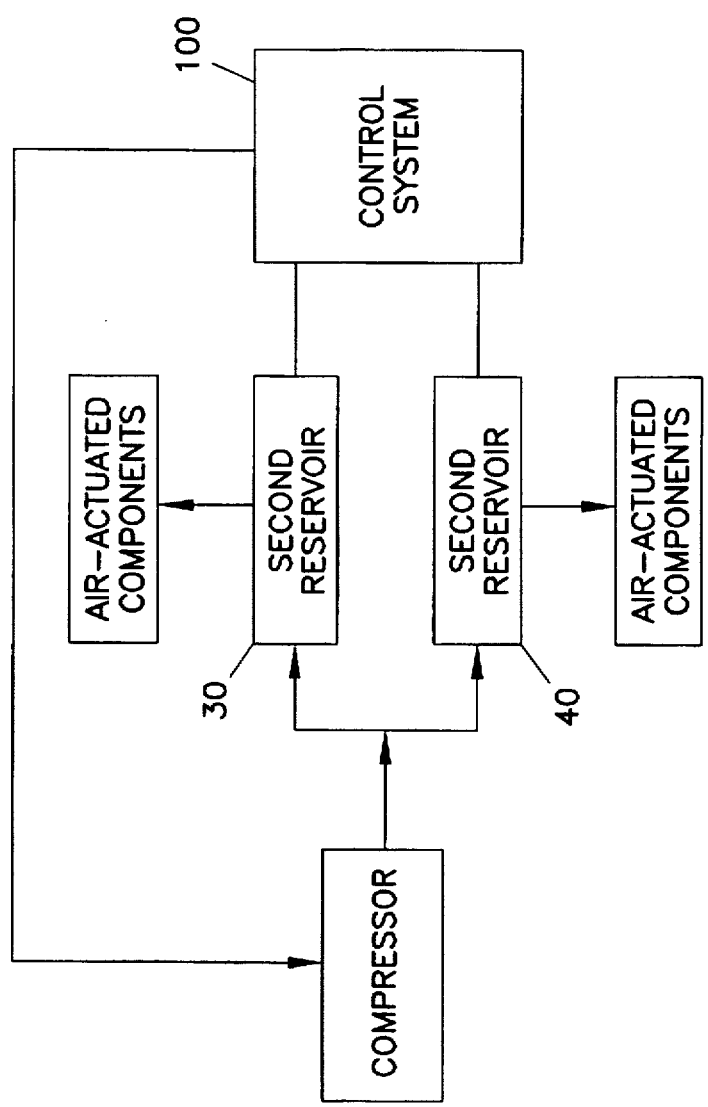
FIG. 7 is a block diagram of one preferred embodiment of the pressurized air system according to the present invention.

FIG. 7 shows a block diagram representation of the pressurized air system 30 having a source of compressed air 39 connected to the first reservoir 50 and the second reservoir 50'. The source of compressed air can be any type of air compressor or other source of compressed air. The control system 60 is operatively connected to the source of compressed air 39 through a device 37 which responds to the control system 60 for controlling the flow of compressed air. The device 37 can be an unloading mechanism, a diverter valve, or other device capable of selectively causing compressed air to flow from the source 39 to the reservoirs 50,50'. Mechanisms such as diverter valves are well-known in the art. It will be apparent to those skilled in the art that the system can operate with any number of reservoirs and air actuated components.

Figure 3:
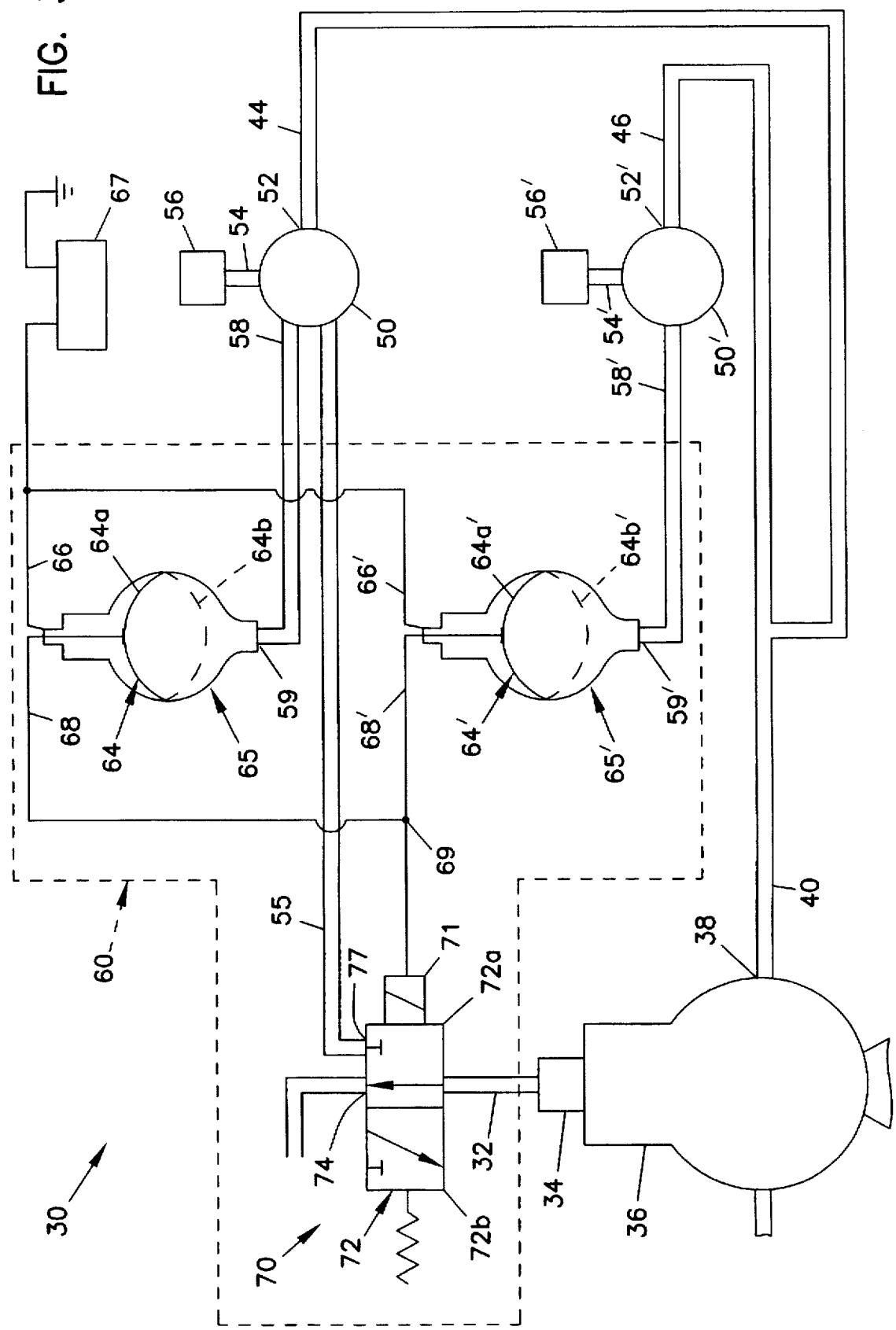
FIG. 3 is a schematic representation of one embodiment of the pressurized air system for controlling air pressures in the air reservoirs of a vehicle, according to the present invention and as shown in FIG. 2, with certain parts of the system shown in various alternative positions.

FIG. 3 shows a detailed schematic representation of one embodiment of the present invention shown in block diagram form in FIG. 2. Referring to FIG. 3, the air compressor 36 is connected from an air compressor outlet 38 to the first reservoir 50 at a first reservoir air inlet 52 by conduits 40 and 44 and to the second reservoir 50' at a second reservoir air inlet 52' by conduits 40 and 46. In another embodiment using multiple reservoirs, all of the reservoirs could be connected in series. It will be apparent to those skilled in the art that one-way valves may be utilized in the actual implementation in order to maintain isolation of the reservoirs, thus preventing any air flow between the reservoirs.

The first reservoir 50 is connected by conduit 54 to the first set of air-actuated components 56. The second reservoir 50' is connected by conduit 54' to the second set of air-actuated components 56'. In one embodiment, one set of air-actuated components includes only service brakes of the tandem and trailer and the other set of air-actuated components includes at least parking brakes, windshield wipers and the tandem front service brakes. The pressurized air system 30, however, is not limited to providing air to only these components.

Figure 6:
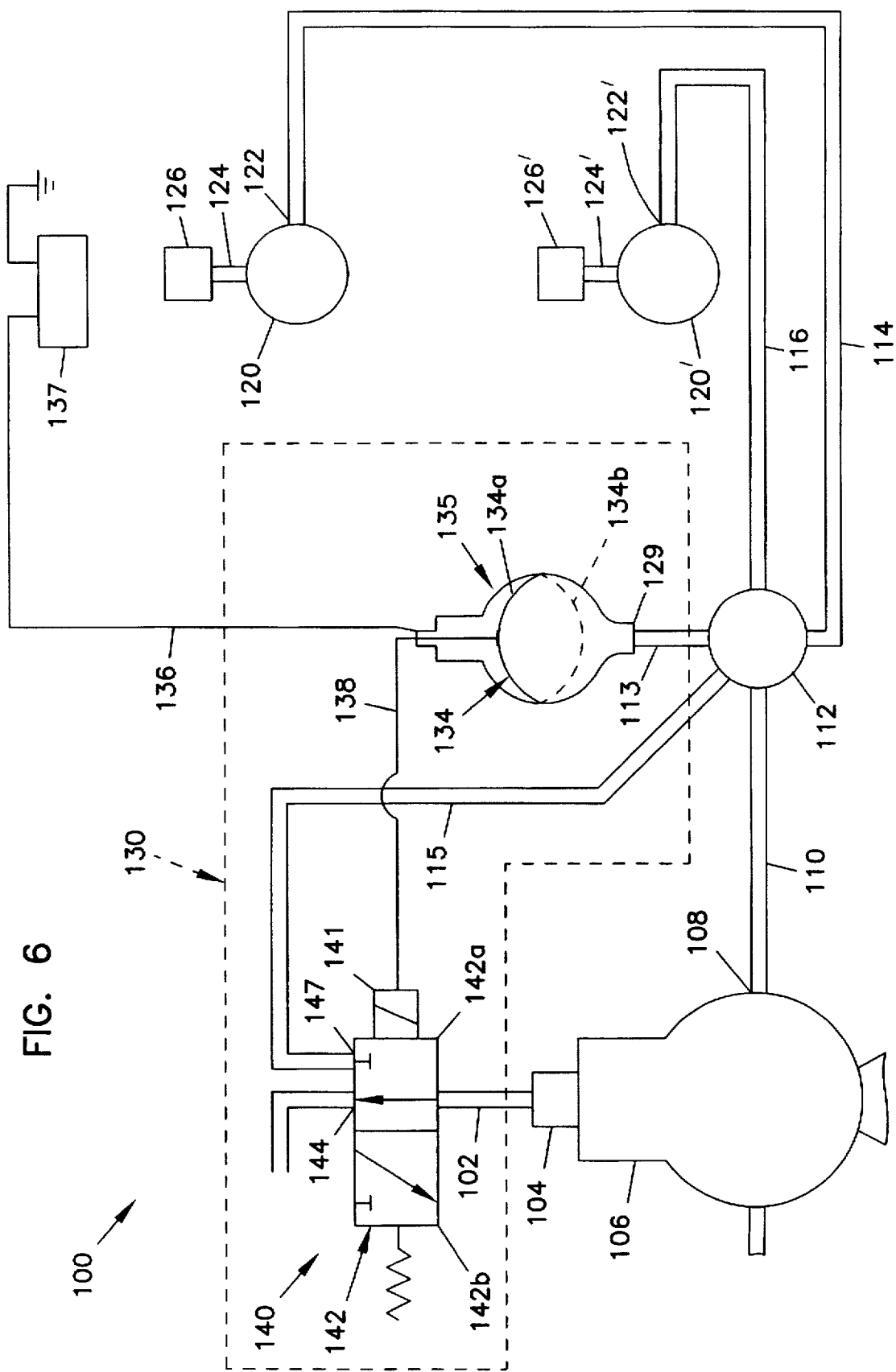
FIG. 6 is a schematic representation of an alternative embodiment of a pressurized air system for controlling air pressures in air reservoirs of a vehicle, with certain parts of the system shown in various alternative positions.

As shown in FIG. 3, the air compressor outlet 38 can be connected directly to the first reservoir 50 by conduits 40 and 44 and to the second reservoir 50' by conduits 40 and 46. Alternatively, the air compressor outlet 38 can be connected directly to a supply reservoir, which is connected to the first and second reservoirs by respective conduits. In the prior art air pressure in the system is measured from the supply reservoir and the operation of the air compressor 36 is controlled responsive to the supply reservoir air pressure. The supply reservoir, however, is not essential to the effective operation of the present invention, but may be included in the present invention to allow conversion from the prior art to the present invention (as shown in FIG. 6, discussed more fully herein). The supply reservoir may also be utilized to provide sufficient air supply capacity for the pressurized air system 30. The supply reservoir provides additional air supply capacity for the pressurized air system 30. When converting prior art to the present invention, it may be necessary to leave the supply reservoir from the prior art intact to maintain the system air supply capacity. Alternatively, larger air reservoirs of sufficient air supply capacity could be used without the need for the additional air supply capacity provided by the supply reservoir.

The control system, generally indicated by the components enclosed in dashed line 60, consist of a first switch 65 and a second switch 65' that are operatively connected to the two reservoirs 50 and 50', respectively. It is to be understood, however, that the present invention performs reliably with only one reservoir and one switch as well as with multiple reservoirs and corresponding multiple switches (i.e., one switch for each reservoir). An actuator 70 is also part of the control system 60, and is configured to respond to electric signals generated by the two switches 65 and 65'.

The first reservoir 50 is connected to the first switch 65 at a first switch air inlet 59 by conduit 58. The second reservoir 50' is connected to the second switch 65' at a second switch air inlet 59' by conduit 58'. The switches 65 and 65' have diaphragms 64 and 64', respectively. The diaphragms 64 and 64' toggle between activated positions 64a and 64a' and deactivated positions 64b and 64b', respectively, in response to air pressure changes in their corresponding reservoirs 50 and 50'. The switches with diaphragms are commercially available and, therefore, are only schematically shown in the drawing. It will be apparent to those skilled in the art that other switches can be utilized to generate electric signals in response to air pressure differentials. For example, a sliding pole switch with a piston acting against a spring to force movement of a pole in response to changing air pressure, can be effectively utilized.

The actuator is comprised of an electric valve setter 71 and a valve 72. The first switch 65 and the second switch 65' are connected in parallel, by electrically conductive leads 68 and 68' respectively, to the electric valve setter 71. The electric valve setter 71 moves the valve 72 between a first position 72a and a second position 72b. The electric valve setter 71 can receive electric signals from both switches 65 and 65'. FIG. 3 shows leads 68 and 68' joining at junction 69 and making one connection to the electric valve setter 71. However, each lead 68 and 68' could be connected directly to the electric valve setter 71. In the preferred embodiment shown in FIG. 3, the electric valve setter 71 is a solenoid. It will be apparent to those skilled in the art, however, that other electrical components could be utilized to move the valve 72 in response to an electric signal.

Both the first switch 65 and the second switch 65' are also connected to a power source, generally indicated at 67, by electrically conductive leads 66 and 66', respectively. It is to be understood that the power source 67 generally represents whatever appropriate voltage is required for energizing the switches 65 and 65', and the electric valve setter 71. The power source 67 can be a battery which is also the battery servicing the vehicle. Alternatively, the power source 67 can be a common electrical bus bar located in the vehicle cab or other appropriate power available to the control system.

FIG. 3 shows the first reservoir 50 connected by conduit 55 to the valve 72 at a valve air inlet 77. However, any reservoir in the pressurized air system 30 can be connected to the valve 72 in this manner. Furthermore, any air supply source, outside of the pressurized air system 30 as shown in FIG. 3, could be connected to the valve 72 in this manner. The valve 72 also has a valve air outlet 74 through which air can be released to the atmosphere outside of the pressurized air system 30. In the first position 72a of the valve, the valve air outlet 74 is open and the valve air inlet 77 is blocked. In the second position 72b of the valve, the valve air outlet 74 is closed and the valve air inlet 77 is unblocked. The valve 72 is also connected to the unloading mechanism 34 by conduit 32. Like the prior art, the unloading mechanism 34 is attached to the air compressor 36 and controls the operation of the air compressor 36.

It will be appreciated by those skilled in the art that the actuator 70 could be modified to mechanically actuate and disengage the compressor. For example, a solenoid could be directly connected to the unloading mechanism 34. The solenoid could be configured and arranged to mechanically operate the unloading mechanism 34 in response to the electric control signals from the switches 65 and 65'. Such a modification is within the scope of this invention.

Figure 5:
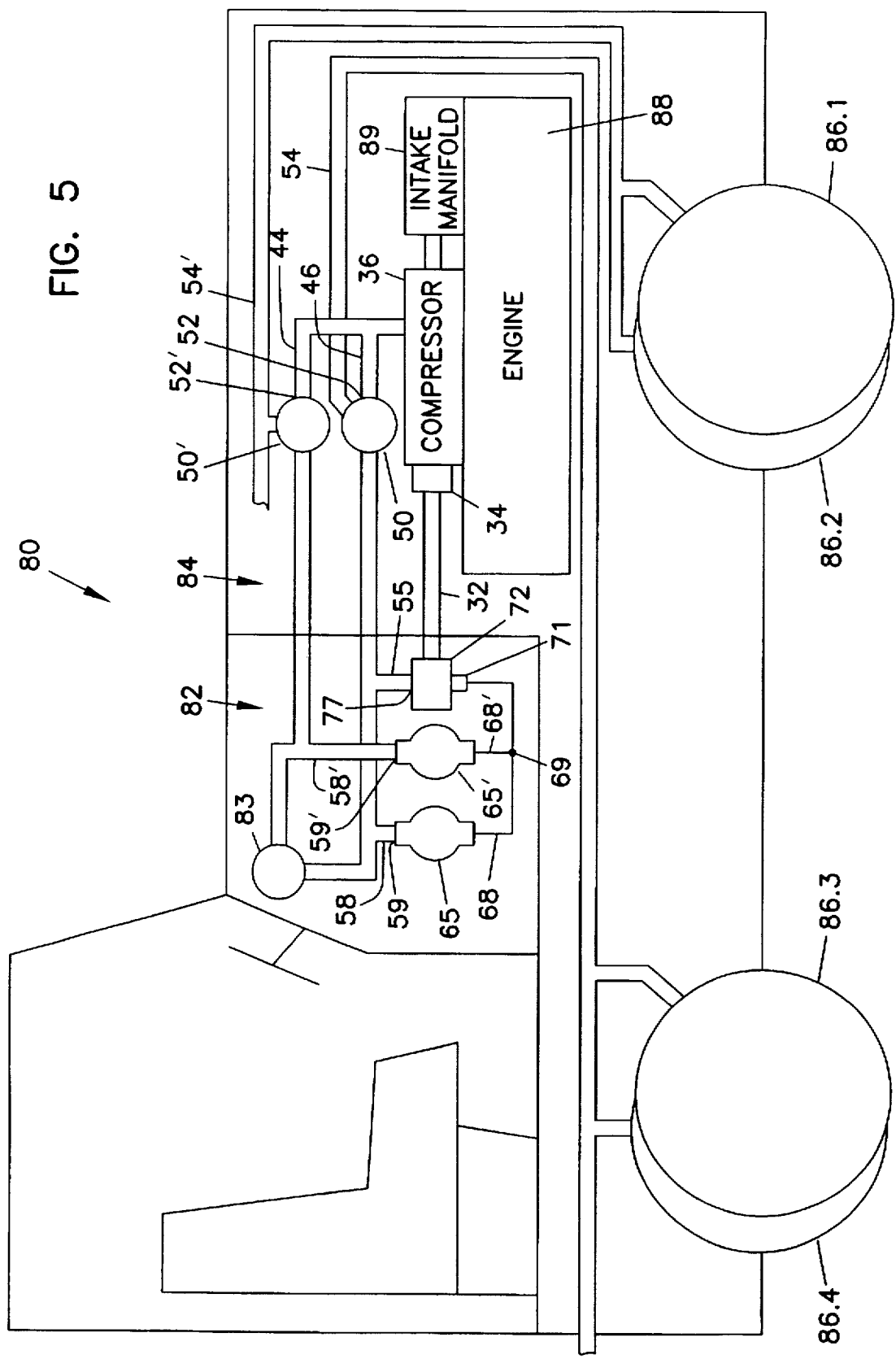
FIG. 5 is a schematic representation of the pressurized air system according to the embodiment shown in FIG. 2, as it is implemented in a vehicle.

FIG. 5 shows a schematic representation of the present invention of the pressurized air system 30 as it is installed in a vehicle or tractor, shown generally at 80. The vehicle has a cab 82, an engine compartment 84, and wheels 86.1, 86.2, 86.3, and 86.4. The air compressor 36 is shown mounted to an engine 88 located in the engine compartment 84. In a typical embodiment, the air compressor 36 is connected to an engine intake manifold 89 for receiving air to compress. Not all compressors, however, receive air from an engine intake manifold. The first reservoir 50 and the second reservoir 50' are shown located in the engine compartment 84 for simplicity. However, these reservoirs are generally hung from frame rails of the vehicle. The first reservoir 50 is shown connected by conduit 54 to the rear wheels 86.3 and 86.4, for supplying air to the rear wheel service brakes, represented as the first set of air-actuated components 56 in FIG. 3. If the vehicle has an attached trailer, conduit 54 is also connected to every operational wheel of the trailer. The second reservoir 50' is shown connected by conduit 54' to the front wheels 86.1 and 86.2. Conduit 54' also connects the second reservoir 50' to any other air-actuated components.

It will be apparent to those skilled in the art that the actual location of air hose and electrical connections to the components in the pressurized air system can be made from many different locations. By way of example, FIG. 5 shows conduit 58 from the first reservoir 50 connected in parallel to an air gauge 83 and the first switch 65. Similarly, conduit 58' from the second reservoir 50' is connected in parallel to the air gauge 83 and the second switch 65'. In an alternative embodiment, the first switch 65 and the second switch 65' can be connected directly to the air gauge at its air inputs for conduits 58 and 58', respectively. Also, the air gauge 83 is shown for illustrative purposes, and is unnecessary to the effective operation of the present invention. Therefore, the reservoirs 50 and 50' could be connected directly to the switches 65 and 65' respectively.

The control system 60 is preferably located in the cab 82 of the vehicle 80. FIG. 5 illustrates the switches 65 and 65' and the actuator 70 mounted within the cab 82. It will be obvious to those skilled in the art that placement of the components of the pressurized air system can vary. For example, the actuator 70 and the switches 65 and 65' can be mounted anywhere on the vehicle.

FIG. 6 represents an alternative embodiment of a pressurized air system 100 according to the present invention. Like the embodiment shown in FIG. 3, this embodiment utilizes a control system 130, operatively connected to an air compressor 106 for actuating and disengaging the air compressor in response to air pressure in the pressurized air system 100. In this embodiment, however, the control system 130 measures and responds to air pressure in a supply reservoir 112, rather than air pressure in reservoirs directly connected to air-actuated components. The alternative configuration permits the use of only one switch 135, within the control system 130, for operative connection to the supply reservoir 112. Referring to FIG. 6, the air compressor 106 is connected from an air compressor outlet 108 to the supply reservoir 112 by conduit 110. The supply reservoir 112 is connected to a first reservoir 120 by conduit 114 and to a second reservoir 120' by conduit 116. The first reservoir 120 is connected by conduit 124 to a first set of air-actuated components 126. The second reservoir 120' is connected by conduit 124' to a second set of air-actuated components 126'.

The supply reservoir 112 is connected to the switch 135 at a switch air inlet 129 by conduit 113. The switch 135 has a diaphragm 134 which toggles between an activated position 134a and a deactivated position 134b in response to air pressure changes in the supply reservoir 112, that flow through conduit 113 and into the switch 135. Preferably the switch is of the same type as the switches 65 and 65', illustrated in the embodiment shown in FIG. 3. The switch 135 is connected by an electrically conductive lead 138 to an electric valve setter 141. The electric valve setter 141 moves a valve 142 to a first position 142a and a second position 142b in response to an electric signal received from the switch 135. In the preferred embodiment shown in FIG. 3, the electric valve setter 141 is a solenoid. However, it will be apparent to those skilled in the art that alternative electrical components may be utilized to move the valve 142.

The switch 135 is also connected to a power source, generally indicated at 137, by electrically conductive lead 136, for generating an electric signal when the diaphragm 134 toggles to the activated position 134a. Like the embodiment shown in FIG. 3, it is to be understood that the power source 137 generally represents whatever appropriate voltage is required for energizing the switch 135 and the electric valve setter 141.

FIG. 6 shows the supply reservoir 112 connected by conduit 115 to the valve 142 at valve air inlet 147. However, the air supply from any reservoir in the pressurized air system 100 can be connected to the valve 142 in this manner. Furthermore, any air supply source, outside of the pressurized air system 100, could be connected to the valve 142 in this manner. The valve 142 has a valve air outlet 144 through which air can be released to the atmosphere outside of the pressurized air system 100. In the first position 142a of the valve, the valve air outlet 144 is open and the valve air inlet 147 is blocked. In the second position 142b of the valve, the valve air outlet 144 is closed and the valve air inlet 147 is unblocked. The valve 142 is further connected by unloading mechanism conduit 102 to an unloading mechanism 104. Like the prior art, the unloading mechanism 104 is attached to the air compressor 106 and controls the operation of the air compressor 106.

Operation

Referring to FIG. 2, generally, the control system 60 drives the air compressor 36 to compress air and to supply compressed air to the first reservoir 50 and the second reservoir 50' at system start-up and during operation when air pressure in either the first reservoir 50 or the second reservoir 50' has decreased to at least the predetermined minimum air pressure ($P_{min}$). The control system 60 drives the air compressor 36 to stop compressing air when air pressures in both the first reservoir 50 and the second reservoir 50' have increased to at least the predetermined maximum air pressure ($P_{max}$).

Referring to FIG. 3, the first switch 65 and the second switch 65' receive air pressure from the first reservoir 50 and the second reservoir 50' respectively, through the first switch air inlet 59 and the second switch air inlet 59' respectively. The first switch 65 measures air pressure in the first reservoir 50 and the second switch 65' measures air pressure in the second reservoir 50'. FIG. 3 shows in schematic view the positions of the diaphragms 64 and 64' resulting from changing air pressures in their corresponding reservoirs 50 and 50'. The first diaphragm 64 in the first switch 65, toggles between the activated position 64a and the deactivated 64b position as a result of air pressure changes in the first reservoir 50. The second diaphragm 64' in the second switch 65', toggles between the activated position 64a' and the deactivated 64b' position as a result of air pressure changes in the second reservoir 50'.

At system start-up and during operation when air pressure in the first reservoir 50 decreases to at least the $P_{min}$, the first diaphragm 64 toggles to the activated position 64a. When the first diaphragm 64 is in the activated position 64a, it touches the lead 68 and sends an electric signal to the electric valve setter 71. The first diaphragm 64 remains in the activated position 64a until air pressure in the first reservoir 50 increases to at least the $P_{max}$, at which time the first diaphragm 64 toggles to the deactivated position 64b. When the first diaphragm 64 is in the deactivated position 64b, no electric signal is sent to the electric valve setter 71 from the first switch 65. The first diaphragm 64 remains in the deactivated position 64b until air pressure in the first reservoir 50 decreases to at least the $P_{min}$ again, at which time the first diaphragm 64 toggles to the activated position 64a and the cycle continues.

In the preferred embodiment, the first switch 65 and the second switch 65' are identical. The foregoing discussion of operation of the first switch 65 applies equally to the second switch 65', except the first switch 65 operates in response to air pressure in the first reservoir 50 and the second switch 65' operates in response to air pressure in the second reservoir 50'. As will be appreciated by those skilled in the art, the switches may be configured to respond to air pressure in exactly the opposite manner. With appropriate wiring and solenoid configuration, the switches 65 and 65' could generate an electric signal when respective reservoir air pressure increased to at least the $P_{max}$ and could cease generating signal when respective reservoir air pressure decreased to at least the $P_{min}$. The changed solenoid configuration would cause the unloading mechanism 34 to hold open a popet valve (not shown) in the compressor when air pressure in both reservoirs increased to $P_{max}$ and to close the popet valve when air pressure in at least one reservoir decreased to the $P_{min}$.

Preferably, the switches 65 and 65' have the following $P_{min}$ and $P_{max}$ settings: $P_{min} \geq 90$ pounds per square inch (psi); and $P_{max} \geq 120$ pounds per square inch (psi), where $P_{min} < P_{max}$. An example of such a switch is an Air Pressure Switch, Model Number PM-512K2-092NC, manufactured by Index Sensors & Controls, Inc. of Bellevue, Wash. The Index Sensors & Controls Air Pressure Switch has settings of $P_{min}$=97–99 psi and $P_{max}$=117–119 psi. The switches 65, 65' can be designed to accommodate any pressure settings, but the preferred embodiment complies with safety regulations for vehicles.

The electric valve setter 71 is electrically connected to the first switch 65 and the second switch 65' by leads 68 and 68' respectively. The electric valve setter 71 responds to the electric signals generated by the switches 65 and 65' and controls the position of the valve 72. When the electric valve setter 71 receives an electric signal from at least one of the first switch 65 and the second switch 65', the valve 72 moves to the first position 72a. When no electric signal is received by the electric valve setter 71 from any switch 65 or 65', then the valve 72 moves to the second position 72b.

In the first position 72a the valve air outlet 74 is blocked from the atmosphere outside of the pressurized air system 30 and in the second position 72b the valve air outlet 74 is open to the atmosphere outside of the pressurized air system 30. When the valve 72 is in the first position 72a, air freely flows from the unloading mechanism 34, through conduit 32 and out of the valve air outlet 74 to outside of the pressurized air system 30. The release of air from the unloading mechanism 34, actuates the air compressor 36, which then begins compressing air and sending air through conduits 40, 44 and 46 to the first reservoir 50 and the second reservoir 50'. When the valve 72 is in the first position 72a, the valve air inlet 77 is blocked and air does not flow from conduit 55 through the valve 72 and into the unloading mechanism 34.

In the second position 72b of the valve 72, the valve air outlet 74 is closed and air does not flow out of the valve air outlet 74 to outside of the pressurized air system. The valve air inlet 77 is unblocked, and air flows from conduit 55 through the valve air inlet 77, through conduit 32 and into the unloading mechanism 34. When the valve 72 is in the second position 72b, the flow of air into the unloading mechanism 34 disengages a compressor popet valve (not shown) which causes the air compressor 36 to stop compressing air.

FIGS. 4(a) through 4(d) show schematically the operation of the pressurized air system 30, according to the embodiment of the present invention as shown in FIGS. 2 and 3, as the air pressures in the reservoirs 50 and 50' vary. For simplicity FIGS. 4(a)–4(d) do not show the dashed line designating the control system 60.

Figure 4:
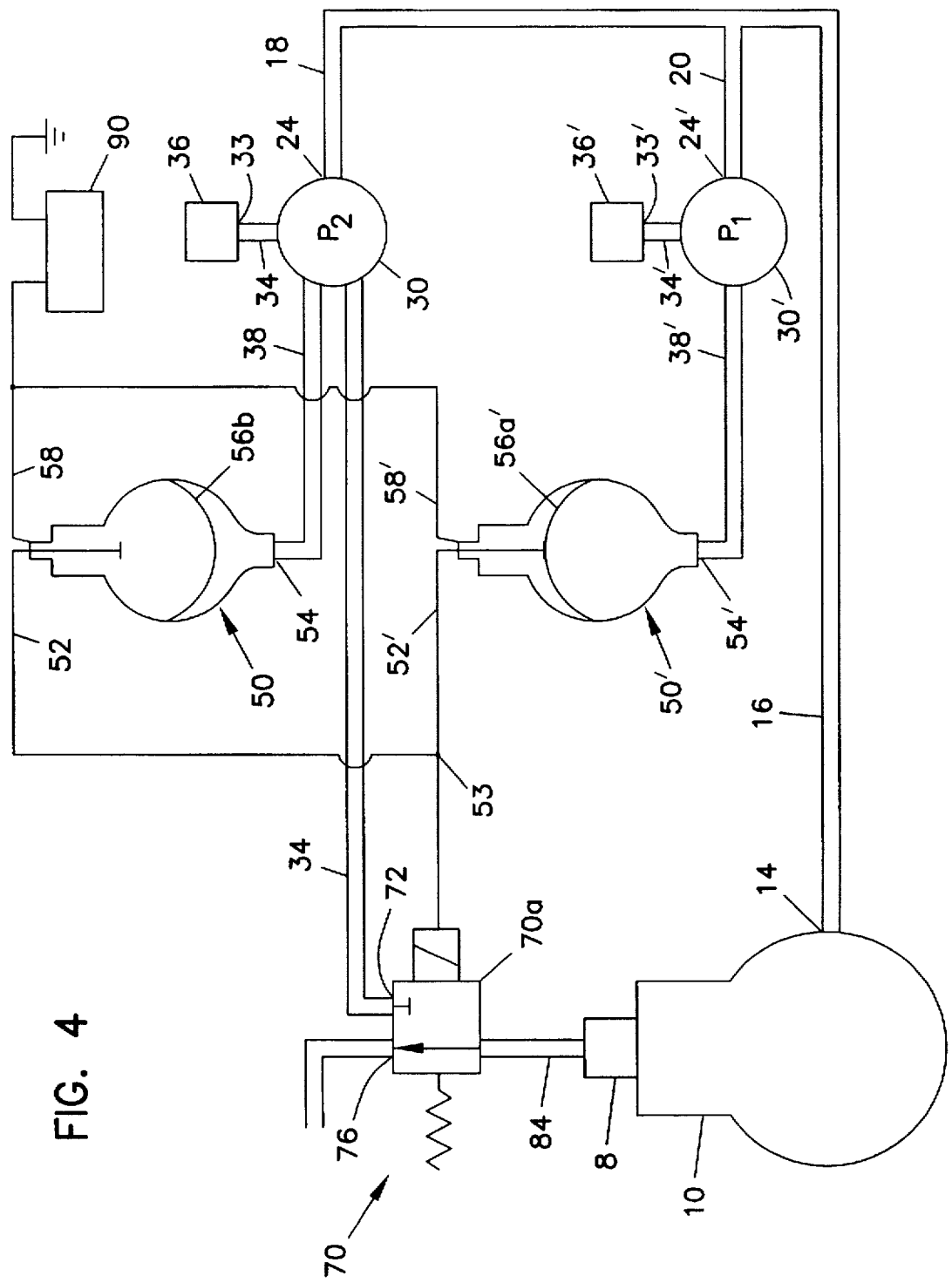
FIGS. 4 and 4(a) through 4(d) schematically show the pressurized air system according to the embodiment shown in FIG. 2, at varying phases during operation.
Figure 4A:
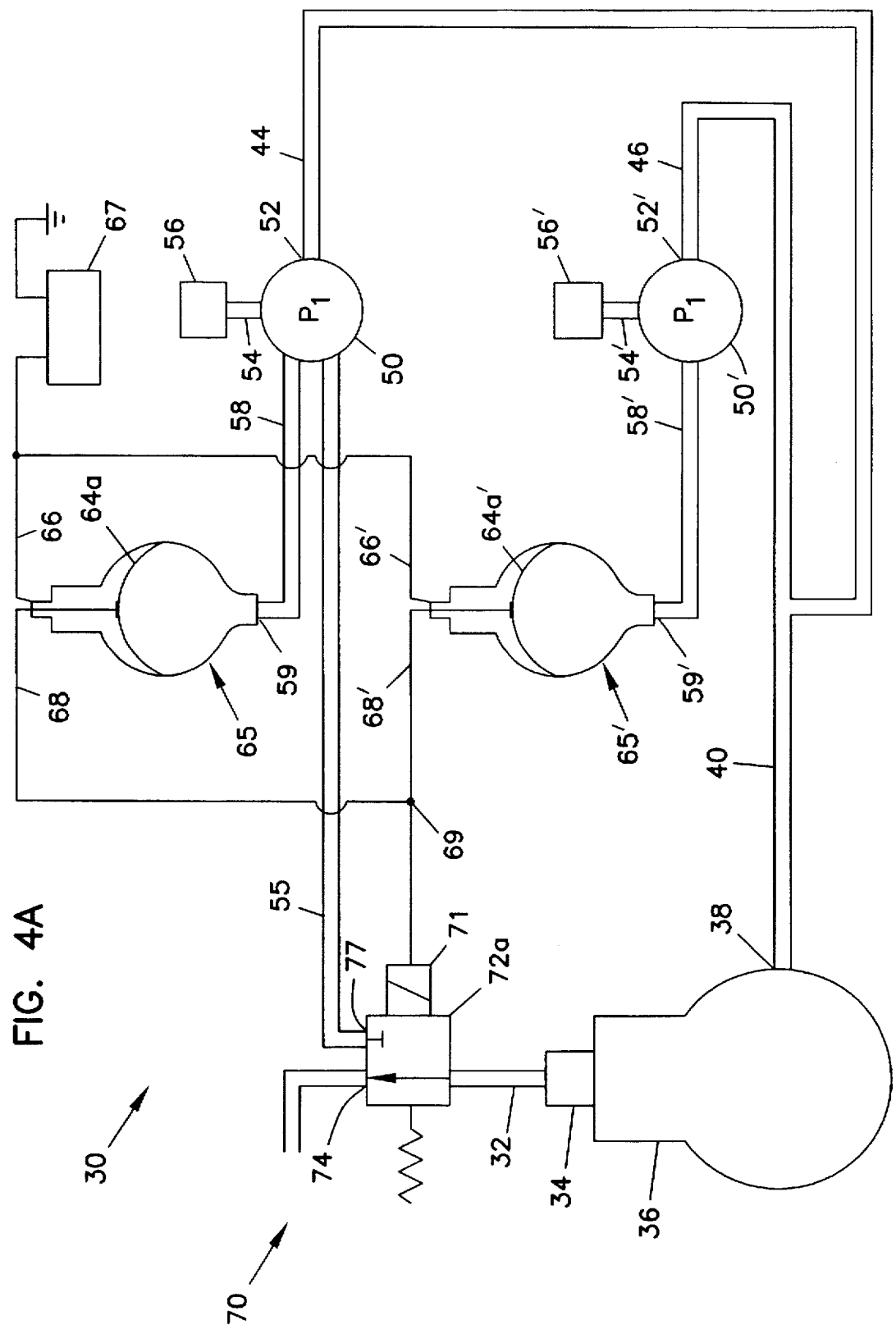

FIG. 4(a) represents the system start-up of the present invention when air pressure in the first reservoir 50, $P_1$, and air pressure in the second reservoir 50', $P_1$, are at least as low as the $P_{min}$ ($P_1 \leq P_{min}$). The $P_1$ air pressure in the first reservoir 50 causes the first diaphragm 64 to toggle to the activated position 64a and to send an electric signal to the electric valve setter 71. The $P_1$ air pressure in the second reservoir 50' causes the second diaphragm 64' to toggle to the activated position 64a and to send an electric signal to the electric valve setter 71. The electric signals from the switches 65 and 65' cause the valve 72 to move to the first position 72a in which the valve air inlet 77 is blocked so that no air passes from conduit 55 through the valve air inlet 77 and to the unloading mechanism 34. The valve air outlet 74 is open such that air is released from the unloading mechanism 34 through conduit 32 and out of the valve air outlet 74 to outside of the pressurized air system 30. The release of air from the unloading mechanism 34 engages the air compressor 36, which begins compressing air and sending the compressed air to the first reservoir 50 and the second reservoir 50' through conduits 40, 44 and 46.

FIG. 4(a) also represents the present invention during other phases of operation. Such phases occur when air pressures in both reservoirs 50 and 50' previously decreased to at least as low as the $P_{min}$. After decreasing to at least as low as the $P_{min}$, and the switches 65 and 65' moved to the activated positions 64a and 64a' respectively, air pressure in at least one of the reservoirs 50 or 50' then increased to an air pressure level higher than the $P_{min}$, but still lower than the $P_{max}$. In this situation, both switches 65 and 65' would be in the activated positions 64a and 64a' respectively, even though one or both of the reservoirs 50 or 50' had an air pressure level greater than the $P_{min}$ but less than the $P_{max}$.

Figure 4B:
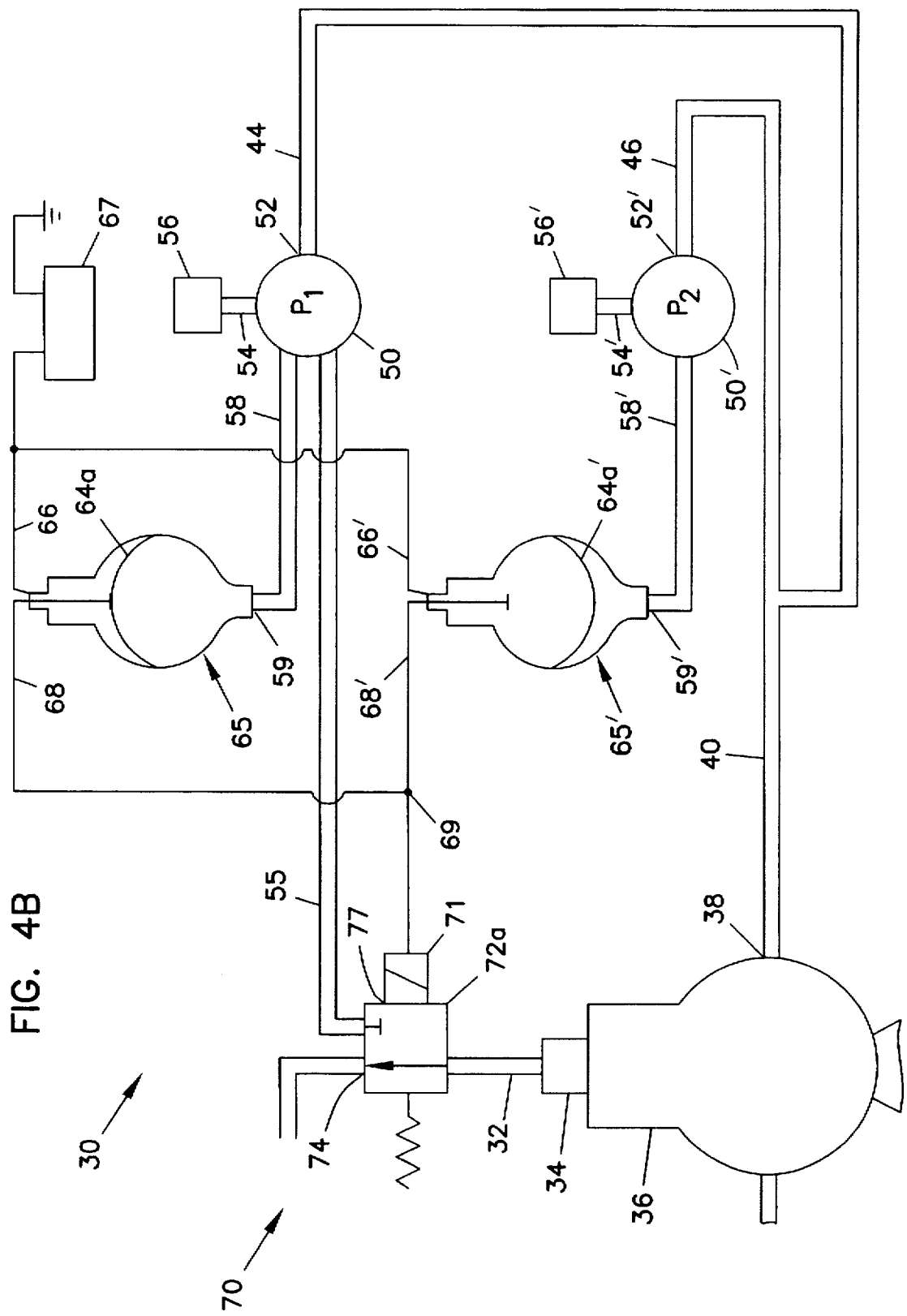

FIG. 4(b) represents the present invention during operation when air pressure in the first reservoir 50, $P_1$, is at least as low as the $P_{min}$ ($P_1 \leq P_{min}$), or when air pressure in the first reservoir 50, $P_1$, previously decreased to at least the $P_{min}$ and is now greater than the $P_{min}$ but is still less than the $P_{max}$ ($P_{min} < P_1 < P_{max}$). Air pressure in the second reservoir 50', $P_2$, is at least as high as the $P_{max}$ ($P_2 \geq P_{max}$), or air pressure in the second reservoir 50', $P_2$, previously increased to at least the $P_{max}$ and is now less than the $P_{max}$ but is still greater than the $P_{min}$ ($P_{min} < P_2 < P_{max}$). During this phase, when air pressure in the first reservoir 50 decreases to at least the $P_{min}$, the first diaphragm 64 toggles to the activated position 64a and the first switch 65 sends an electric signal to the electric valve setter 71. When air pressure in the second reservoir 50' increases to at least the $P_{max}$, the second diaphragm 64' toggles to the deactivated position 64b and no electric signal is generated from the second switch 65'. The electric signal from the first switch 65, however, causes the valve 72 to move to the first position 72a in which the valve air inlet 77 is blocked so that no air passes from conduit 55 through the valve air inlet 77 and to the unloading mechanism 34. The valve air outlet 74 is open such that air is released from the unloading mechanism 34 through conduit 32 and out of the valve air outlet 74 to outside of the pressurized air system 30. The release of air from the unloading mechanism 34 engages the air compressor 36, which begins compressing air and sending the compressed air to the first reservoir 50 and the second reservoir 50' through conduits 40, 44 and 46.

Figure 4C:
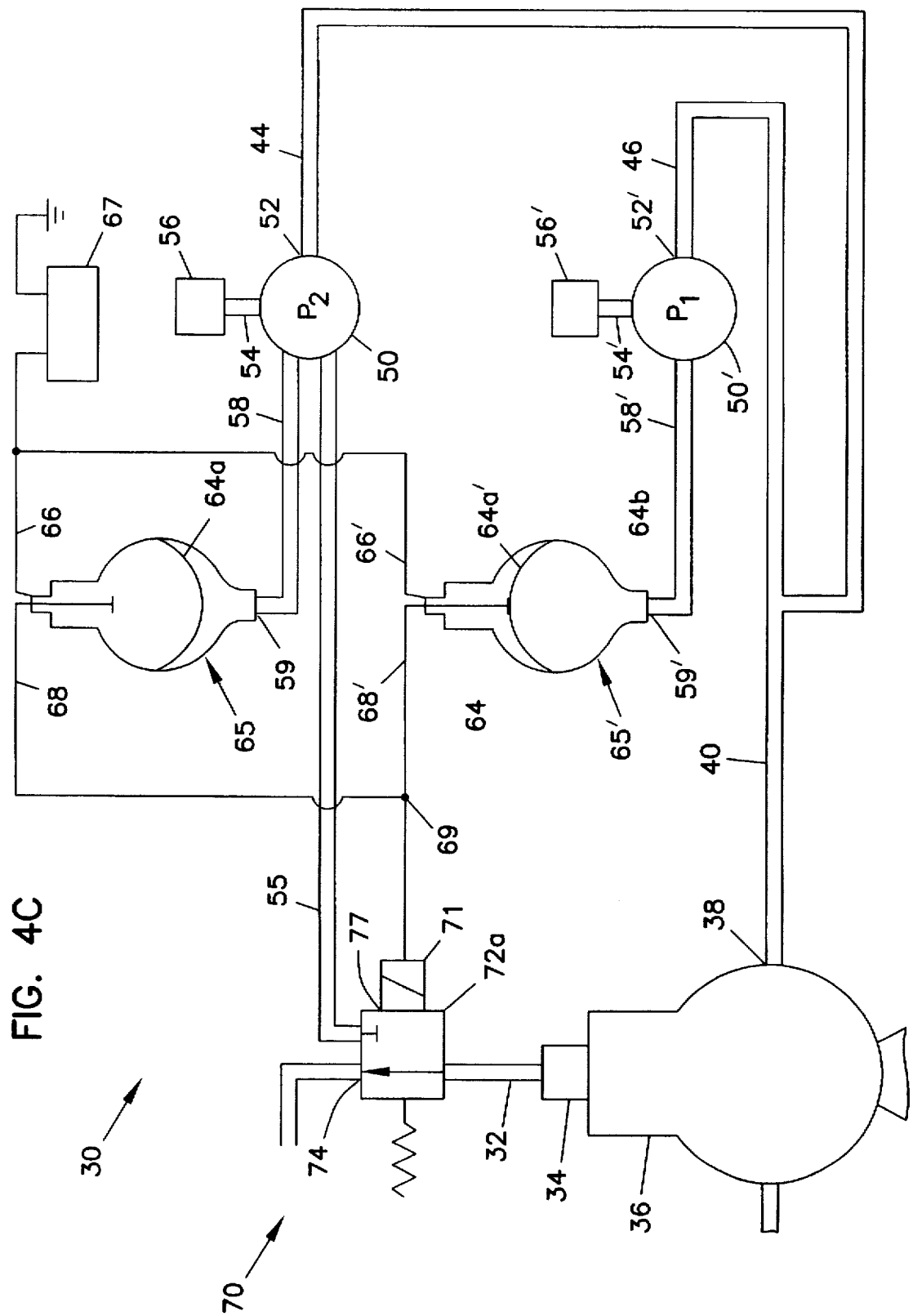

FIG. 4(c) represents the present invention during operation when air pressure in the first reservoir 50, $P_2$, is at least as high as the $P_{max}$ ($P_2 \geq P_{max}$), or air pressure in the first reservoir 50, $P_2$, previously increased to at least the $P_{max}$ and is now less than the $P_{max}$ but is still greater than the $P_{min}$ ($P_{min} < P_2 < P_{max}$). Air pressure in the second reservoir 50', $P_1$, is at least as low as the $P_{min}$ ($P_1 \leq P_{min}$), or air pressure in the second reservoir 50', $P_1$, previously decreased to at least the $P_{min}$ and is now greater than the $P_{min}$ but is still less than the $P_{max}$ ($P_{min} < P_1 < P_{max}$). During this phase, when air pressure in the first reservoir 50 increases to at least the $P_{max}$, the first diaphragm 64 toggles to the deactivated position 64b and no electric signal is generated from the first switch 65. When air pressure in the second reservoir 50' decreases to at least the $P_{min}$, the second diaphragm 64' toggles to the activated position 64a and the second switch 65' sends an electric signal to the electric valve setter 71. The electric signal from the second switch 65' causes the valve 72 to move to the first position 72a in which the valve air inlet 77 is blocked so that no air passes from conduit 55 through the valve air inlet 77 and to the unloading mechanism 34. The valve air outlet 74 is open and air is released from the unloading mechanism 34 through conduit 32 and out of the valve air outlet 74 to outside of the pressurized air system 30. The release of air from the unloading mechanism 34 engages the air compressor 36, which begins compressing air and sending the compressed air to the first reservoir 50 and the second reservoir 50' through conduits 40, 44 and 46.

Figure 4D:
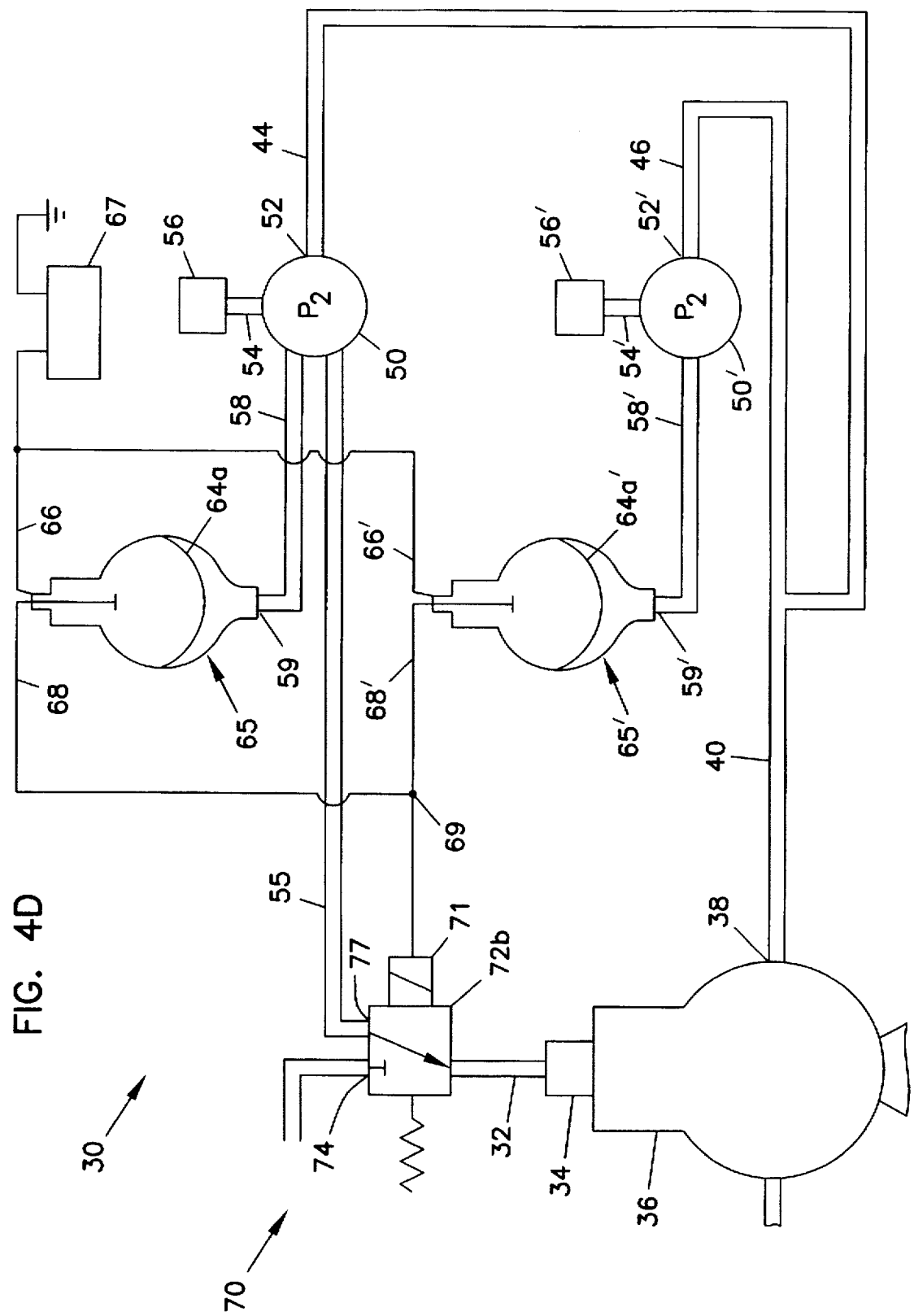

FIG. 4(d) represents the present invention during operation when air pressure in the first reservoir 50, $P_2$, is at least as high as the $P_{max}$ ($P_2 \geq P_{max}$), or when air pressure in the first reservoir 50 previously increased to at least the $P_{max}$ and is now less than the $P_{max}$ but is still greater than the $P_{min}$ ($P_{min} < P_2 < P_{max}$). Air pressure in the second reservoir 50', $P_2$, is also at least as high as the $P_{max}$ ($P_2 \geq P_{max}$), or air pressure in the second reservoir 50', $P_2$, previously increased to at least the $P_{max}$ and is now less than the $P_{max}$ but is still greater than the $P_{min}$ ($P_{min} < P_2 < P_{max}$). When air pressure in the first reservoir 50 increases to at least the $P_{max}$, the first diaphragm 64 toggles to the deactivated position 64b and no electric signal is generated from the first switch 65. When air pressure in the second reservoir 50' increases to at least the $P_{max}$, the second diaphragm 64' toggles to the deactivated position 64b' and no electric signal is generated from the second switch 65'. When the electric valve setter 71 does not receive an electric signal, the valve 72 moves to the second position 72b in which the valve air inlet 77 is unblocked. The valve air outlet 74 is closed so that air flows from conduit 55 through the unblocked valve air inlet 77, through conduit 32 and into the unloading mechanism 34. The air then passes from the unloading mechanism 34 into the air compressor 36. The flow of air into the unloading mechanism 34 disengages the compressor popet valve (not shown) which causes the air compressor 36 to stop compressing air. The system remains in this state until air pressure in at least one of the first reservoir 50 and the second reservoir 50' decreases to at least the $P_{min}$.

The operation of the pressurized air system 100 according to the alternative embodiment illustrated in FIG. 6, can be described with reference to FIG. 6. The operation of the switch 135 is identical to the operation of the switches 65 and 65' previously described, and the operation of the actuator 140 is identical to the operation of the actuator 70, also previously described. However, in the embodiment shown in FIG. 6, the switch 135 receives air pressure from the supply reservoir 112 by conduit 113 at the switch air inlet 129. When the air pressure in the supply reservoir decreases to at least the predetermined minimum air pressure ($P_{min}$), the diaphragm 134 toggles to the activated position 134a and the switch 135 sends an electric signal to the electric valve setter 141. The electric signal from the switch 135 causes the valve 142 to move to the first position 142a in which the valve air inlet 147 is blocked so that no air passes through the valve air inlet 147 and to the unloading mechanism 104. The valve air outlet 144 is open such that air is released from the unloading mechanism 104 through conduit 102 and out of the valve air outlet 144 to outside of the pressurized air system 100. The release of air from the unloading mechanism 104 engages the air compressor 106, which begins compressing air and sending the compressed air to the supply reservoir 112, which then travels to the first reservoir 120 and the second reservoir 120' through conduits, 114 and 116 respectively.

The diaphragm 134 remains in the activated position 134b until air pressure in the supply reservoir 112 increases to at least the $P_{max}$, at which time the diaphragm 134 toggles to the deactivated position 134b. When the diaphragm 134 is in the deactivated position 134b, no electric signal is generated from the switch 135. When the electric valve setter 141 does not receive an electric signal, the valve 142 moves to the second position 142b in which the valve air inlet 147 is unblocked. The valve air outlet 144 is closed so that air flows from the conduit 115 through the unblocked valve air inlet 147, through conduit 102 and into the unloading mechanism 104. The air then passes from the unloading mechanism 104 into the air compressor 106. The flow of air disengages the air compressor 106 which stops compressing air. The pressurized air system 100 remains in this state until air pressure in supply reservoir 112 decreases to at least the $P_{min}$.

The control system 60 of FIG. 2 can utilize other means for controlling the air compressor 36. For example, the control system can operate a diverter valve to control the compressor 36. When the air pressure in at least one of the air reservoirs 50,50' has reached at least a predetermined minimum, the control system 60 will close the diverter valve so that the compressed air flows from the compressor 36 to the air reservoirs 50,50'. When the air pressure in both of the air reservoirs 50,50' has reached at least a predetermined maximum, the control system 60 opens the diverter valve so that compressed air is released from the compressor 36, rather than flowing to the air reservoirs 50,50'. In such an embodiment, the compressor 36 continually compresses air, with the compressed air flowing to the air reservoirs 50,50' only when needed. As shown in FIG. 7, the device 37, which can be an unloading mechanism, a diverter valve or the like, can be used to control a typical air compressor as previously described herein or any other source of compressed air 39.

The scope of the present invention also covers an alternative embodiment using microprocessors and air pressure sensors to monitor reservoir air pressure and thereby control compression of air by the air compressor. Such an embodiment could be implemented consistent with the configuration of FIG. 3, monitoring air pressure from each reservoir directly, or FIG. 6, monitoring air pressure solely from the supply reservoir. Air pressure sensors would be configured to sense the air pressure in the appropriate reservoirs. The air pressure sensors would be operatively connected to a microprocessor for generating a signal indicative of the sensed air pressure. The microprocessor would be operatively connected to the air compressor and would respond to the sensed air pressure signal(s) by providing a control signal to actuate or disengage the air compressor. Such an embodiment is well within the scope of the present invention and could be configured using a variety of electrical components.

The control system 60 of the present invention has many advantages. The switches 65 and 65' and the actuator 70 can be placed in any area of the vehicle, preferably in the cab which is advantageously removed from the engine and the air compressor 36. Placement in the cab insulates the control system 60 from excessive vibration from the engine, dirt from the engine, extreme temperature fluctuations, moisture, and other problematic external parameters. The switches 65 and 65' each have only one (1) moving part and the actuator 70 is controlled by only one (1) electric valve setter 71. The small number of moving parts within the control system 60 simplifies maintenance and troubleshooting and most importantly, increases reliability. In one embodiment of the present invention illustrated in FIGS. 2–4, air pressure is monitored directly from the air reservoirs 50 and 50' to adjust the flow of compressed air through the pressurized air system 30, making the detection of low or high air pressure in the reservoirs 50 and 50' very accurate. In another embodiment illustrated in FIG. 6, air pressure is monitored from the supply reservoir 112 to adjust the flow of compressed air through the pressurized air system 100, simplifying conversion from the prior art to the present invention. Finally, existing prior art can be easily converted to any of the embodiments illustrated and/or described herein.

Although the present invention has been described with reference to the preferred embodiments, those skilled in the art will recognize that changes may be made in form and detail without departing from the spirit and scope of the invention. Accordingly, it is intended that the scope of the present invention only be limited by the scope of the claims which are appended hereto.

What is claimed is:

1. A pressurized air system of the type having an air compressor which supplies compressed air to at least one reservoir when the air compressor is actuated, and wherein the reservoir delivers compressed air to a set of air-actuated components, wherein the improvement comprises a control system for controlling the air compressor, the control system comprising:

a. an actuator operatively connected to the air compressor, said actuator forcing compressed air to flow from the air compressor to the reservoir when air pressure in the air reservoir decreases to at least a predetermined minimum, and said actuator interrupting the flow of compressed air from the air compressor to the reservoir when air pressure in the air reservoir increases to at least a predetermined maximum;

b. a controller operatively connected to said actuator for providing a control signal to said actuator, the control signal indicative of air pressure in the air reservoir;

c. said actuator including:
      i. a valve having a first position and a second position with said actuator forcing compressed air to flow from the air compressor to the reservoir when said valve is in said first position and said actuator interrupting the flow of compressed air from the air compressor to the reservoir when said valve is in said second position; and
      ii. an electric valve setter for moving said valve between the first position and the second position, said electric valve setter responsive to the control signal.

2. A pressurized air system according to claim 1 wherein said actuator is a diverter valve.

3. A pressurized air system according to claim 1 wherein said actuator is an unloading mechanism.

4. A pressurized air system according to claim 1 wherein said controller comprises a switch having:

a. an activated position and a de-activated position;

b. a switch air inlet connected to the reservoir with said switch shifted between said activated position and said de-activated position in response to a pressure of air admitted at said switch air inlet; and c. a valve lead electrically connected to said electric valve setter for transmitting the control signal from said switch to said electric valve when said switch is in the activated position.

5. A pressurized air system according to claim 4 wherein said switch comprises a diaphragm, located inside said switch, for moving between the activated position and the de-activated position in response to said air pressure in the reservoir.

6. A pressurized air system for controlling air-actuated components, the pressurized air system comprising:

a. an air compressor having an air compressor outlet for compressed air;

b. at least one reservoir for compressed air with a reservoir air inlet connected to the air compressor outlet and a reservoir output connected to a set of air-actuated components; and c. a control system for controlling the flow of air from said air compressor, said control system comprising:
      i. an actuator operatively connected to said air compressor, said actuator forcing compressed air to flow from said air compressor to said reservoir when air pressure in said reservoir decreases to at least a predetermined minimum and said actuator interrupting the flow of compressed air from said air compressor to said reservoir when air pressure in said reservoir increases to at least a predetermined maximum; and ii. a controller operatively connected to said actuator for providing a control signal to said actuator indicative of air pressure in said reservoir;

d. said actuator including:

i. a valve having a first position and a second position with said actuator forcing compressed air to flow from said air compressor to said reservoir when said valve is in said first position and said actuator interrupting the flow of compressed air from said air compressor to said reservoir when said valve is in said second position; and ii. an electric valve setter moving said valve between the first position and the second position, said electric valve setter responsive to the control signal.

7. A pressurized air system according to claim 6 wherein said controller comprises a switch having:

a. an activated position and a de-activated position;

b. a switch air inlet connected to said reservoir with said switch shifted between said activated position and said de-activated position in response to a pressure of air admitted at said switch air inlet; and c. a valve lead electrically connected to said electric valve setter for transmitting the control signal from said switch to said electric valve setter when said switch is in said activated position.

8. A pressurized air system according to claim 6 wherein said actuator is a diverter valve.

9. A pressurized air system for controlling air-actuated components, the pressurized air system comprising:

a. a source of compressed air having a source outlet for compressed air;

b. at least one reservoir for compressed air with a reservoir air inlet connected to the source outlet and a reservoir output connected to a set of air actuated components; and c. a control system for controlling said source, said control system comprising:

i. an actuator operatively connected to said source, said actuator forcing the flow of compressed air from said source to said reservoir when air pressure in said reservoir decreases to at least a predetermined minimum and said actuator interrupting the flow of compressed air from said source to said reservoir when air pressure in said reservoir increases to at least a predetermined maximum; and ii. a controller operatively connected to said actuator for providing a control signal to said actuator indicative of air pressure in said reservoir;

d. said actuator including:

i. a valve having a first position and a second position with said actuator forcing the flow of compressed air from said source to said reservoir when said valve is in said first position and said actuator interrupting the flow of compressed air from said source to said reservoir when said valve is in said second position; and ii. an electric valve setter moving said valve between the first position and the second position, said electric valve setter responsive to the control signal.

10. A pressurized air system according to claim 9 wherein said controller comprises a switch having:

a. an activated position and a de-activated position;

b. a switch air inlet connected to said reservoir with said switch shifted between said activated position and said de-activated position in response to a pressure of air admitted at said switch air inlet; and c. a valve lead electrically connected to said electric valve setter for transmitting the control signal from said switch to said electric valve setter when said switch is in said activated position.

11. A pressurized air system according to claim 9 wherein said source of compressed air is an air compressor.

12. A pressurized air system according to claim 11 wherein said actuator is a diverter valve.

* * * * *

UNITED STATES PATENT AND TRADEMARK OFFICE
CERTIFICATE OF CORRECTION

PATENT NO. : 5,795,134

DATED : AUGUST 18, 1998

INVENTOR(S) : MALECHA

It is certified that error appears in the above-identified patent and that said Letters Patent is hereby corrected as shown below:

Col. 9, line 61: "$\geq 120$" should read --$\leq 120$--

Signed and Sealed this

Eleventh Day of January, 2000

Attest:

Q. TODD DICKINSON

*Attesting Officer*    *Acting Commissioner of Patents and Trademarks*